US012801370B2

(12) United States Patent
Miyazawa et al.

(10) Patent No.: US 12,801,370 B2
(45) Date of Patent: Nov. 17, 2026

(54) SOFTWARE MANAGEMENT SYSTEM FOR VEHICLE, SOFTWARE MANAGEMENT METHOD FOR VEHICLE, AND NON-TRANSITORY STORAGE MEDIUM

(71) Applicant: TOYOTA JIDOSHA KABUSHIKI KAISHA, Toyota (JP)

(72) Inventors: Tomoaki Miyazawa, Nagoya (JP); Ryota Nakabayashi, Nagoya (JP); Naoki Yomoda, Toyota (JP); Atsushi Mori, Miyoshi (JP); Hiroshi Inoue, Nagoya (JP); Tsukasa Kitazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 335 days.

(21) Appl. No.: 18/592,605

(22) Filed: Mar. 1, 2024

(65) Prior Publication Data

US 2024/0296041 A1 Sep. 5, 2024

(30) Foreign Application Priority Data

Mar. 3, 2023 (JP) ................................ 2023-032889

(51) Int. Cl.
*G06F 8/65* (2018.01)
*H04W 76/15* (2018.01)
*H04W 84/12* (2009.01)

(52) U.S. Cl.
CPC .............. *G06F 8/65* (2013.01); *H04W 76/15* (2018.02); *H04W 84/12* (2013.01)

(58) Field of Classification Search
CPC .......... G06F 8/65; H04W 76/15; H04W 84/12
See application file for complete search history.

(56) References Cited

U.S. PATENT DOCUMENTS 11,115,813 B1 * 9/2021 Parker ...................... H04L 45/24
2005/0223114 A1 * 10/2005 Hanson ............... H04L 41/0893 709/245
2015/0304324 A1 * 10/2015 Kirsch .................. H04W 12/06 726/5
2017/0024201 A1 * 1/2017 Diedrich ................... G06F 8/65
2018/0077592 A1 * 3/2018 Kim ....................... H04L 65/612
2018/0108186 A1 * 4/2018 Lin ......................... G06F 8/654
2020/0125335 A1 4/2020 Neoh
2020/0348923 A1 * 11/2020 Mezaael ................. G06F 8/658

FOREIGN PATENT DOCUMENTS

JP 6888845 B2 6/2021

* cited by examiner

*Primary Examiner* — Wei Y Mui
*Assistant Examiner* — Brahim Bourzik
(74) *Attorney, Agent, or Firm* — Oliff PLC

(57) ABSTRACT

A software management system for a vehicle, the software management system includes: a first communication device configured to receive update data for software via a wireless local area network (LAN); a second communication device configured to receive the update data via a cellular line; and one or more electronic control units configured to determine whether a connection between the wireless LAN and the first communication device will be disconnected during reception of the update data via the wireless LAN, and, when determining that the connection between the wireless LAN and the first communication device will be disconnected, make an inquiry to a user of the vehicle regarding whether reception of the update data via the cellular line is acceptable.

8 Claims, 2 Drawing Sheets

SOFTWARE MANAGEMENT SYSTEM FOR VEHICLE, SOFTWARE MANAGEMENT METHOD FOR VEHICLE, AND NON-TRANSITORY STORAGE MEDIUM

CROSS-REFERENCE TO RELATED APPLICATION

This application claims priority to Japanese Patent Application No. 2023-032889 filed on Mar. 3, 2023 incorporated herein by reference in its entirety.

BACKGROUND

1. Technical Field

The disclosure relates to a software management system for a vehicle, a software management method for a vehicle, and a non-transitory storage medium.

2. Description of Related Art

In a software management system described in Japanese Patent No. 6,888,845, upon receiving a wake-up request from a wireless access point, a communication unit transitions from a sleep state to a wake-up state, and begins wireless communication with an external device. Software of electronic equipment is then updated with update data that is downloaded from the external device.

SUMMARY

When downloading update data over a cellular line causes a fee to be incurred, a user of a vehicle will be disadvantaged due to the download being performed over the cellular line without consent of the user. As a result, there is a likelihood that user convenience will deteriorate.

A software management system for a vehicle according a first aspect of the present disclosure, includes a first communication device configured to receive update data for software via a wireless LAN; a second communication device configured to receive the update data via a cellular line; and one or more electronic control units configured to determine whether a connection between the wireless LAN and the first communication device will be disconnected during reception of the update data via the wireless LAN, and, when determining that the connection between the wireless LAN and the first communication device will be disconnected, make an inquiry to a user of the vehicle regarding whether reception of the update data via the cellular line is acceptable.

A software management method according to a second aspect of the present disclosure is for a vehicle including a first communication device configured to receive update data for software via a wireless LAN and a second communication device configured to receive the update data via a cellular line. The software management method includes: determining, by one or more electronic control units, whether a connection between the wireless LAN and the first communication device will be disconnected during reception of the update data via the wireless LAN; and making, by the one or more electronic control units, an inquiry to a user of the vehicle regarding whether reception of the update data via the cellular line is acceptable, when determination is made that the connection between the wireless LAN and the first communication device will be disconnected.

A non-transitory storage medium according to a third aspect of the present disclosure stores instructions for managing software of a vehicle including a first communication device configured to receive update data for the software via a wireless LAN and a second communication device configured to receive the update data via a cellular line, the instructions being executable by one or more electronic control units and causing the electronic control units to perform functions. The functions include determining whether a connection between the wireless LAN and the first communication device will be disconnected during reception of the update data via the wireless LAN; and making an inquiry to a user of the vehicle regarding whether reception of the update data via the cellular line is acceptable, when determination is made that the connection between the wireless LAN and the first communication device will be disconnected.

When determining that the connection with the wireless LAN will be disconnected, an inquiry is made to the user of the vehicle regarding whether reception of update data via the cellular line is acceptable. Accordingly, user convenience is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
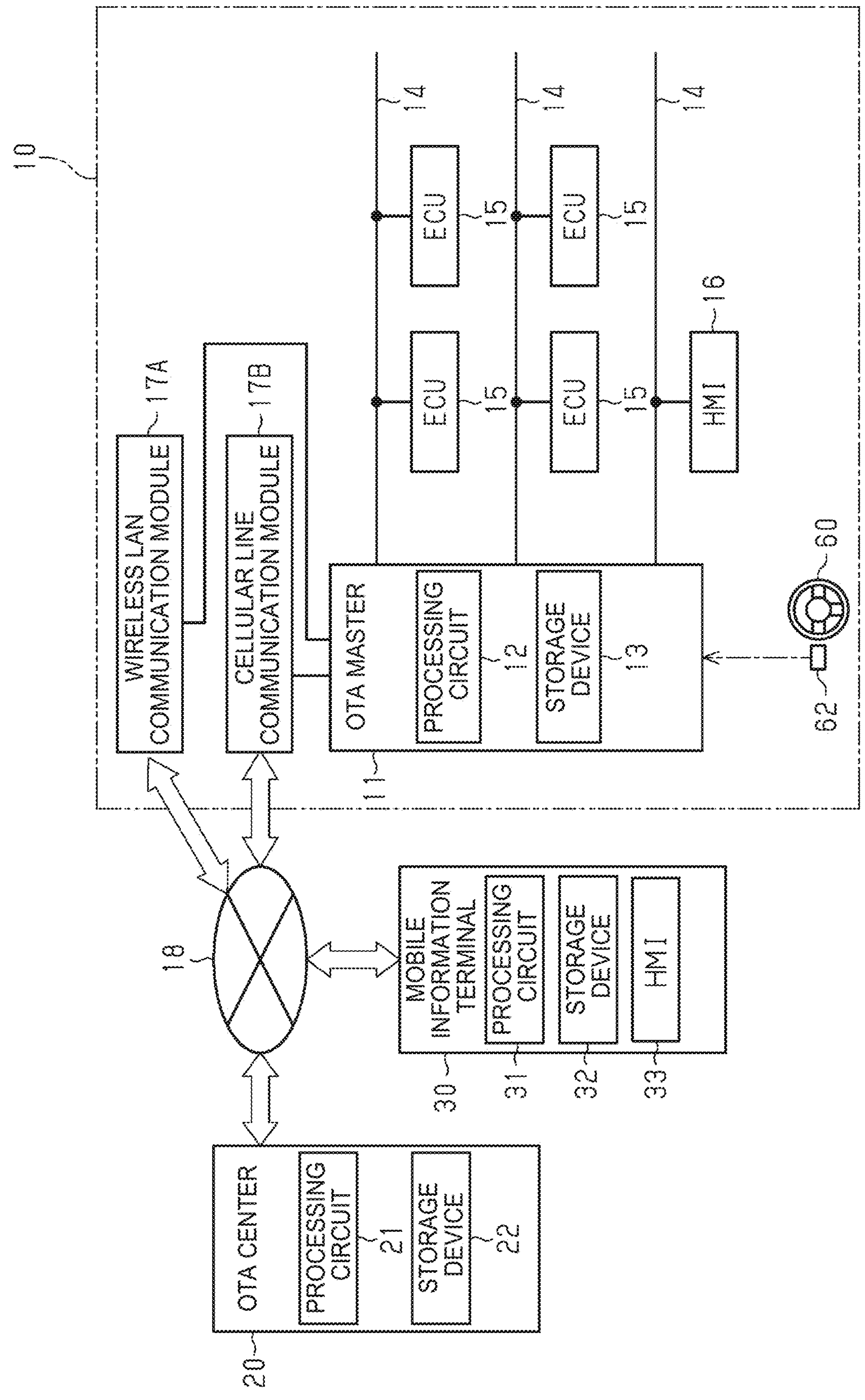
FIG. 1 is a diagram schematically illustrating a configuration of a software management system according to an embodiment.

Hereinafter, an embodiment of a software management system for a vehicle, a software management method for a vehicle, and a non-transitory storage medium, will be described with reference to FIGS. 1 and 2.

Configuration of Software Management System

First, a configuration of the software management system for a vehicle, according to the present embodiment, will be described with reference to FIG. 1. The software management system according to the present embodiment is a system that manages software of a vehicle 10.

The vehicle 10 is equipped with various electronic control units (ECUs) 15 that control various parts of the vehicle 10, and an over-the-air (OTA) master 11 that manages software updates in the vehicle 10. Examples of the ECUs 15 include an engine ECU, a transmission ECU, a brake ECU, an advanced driver assistance ECU, and a multimedia ECU.

The OTA master 11 includes a processing circuit 12 and a storage device 13. The storage device 13 stores, in advance, a program for management of software updates. The OTA master 11 is configured to perform processing related to management of software updates by the processing circuit 12 reading and executing the program stored in the storage device 13.

A wireless LAN communication module 17A, which is a first communication device for communicating with an external network 18 constructed outside of the vehicle 10, is connected to the OTA master 11. The wireless LAN communication module 17A receives update data for software via the wireless LAN. The wireless LAN according to the present embodiment is a local area network (LAN) that performs Wi-Fi (registered trademark) communication.

Also, a cellular line communication module 17B, which is a second communication device for communicating with the external network 18, is connected to the OTA master 11. The cellular line communication module 17B receives update data for software via a cellular line, which is a mobile communication network.

The vehicle 10 is equipped with a human-machine interface (HMI) 16. The HMI 16 includes an input device that receives operations from an occupant, and an output device that presents information to the occupant through images and audio. The HMI 16 according to the present embodiment has automotive navigation system functions for guiding over a travel route of the vehicle 10. The OTA master 11, the ECUs 15, and the HMI 16 are configured to be capable of communicating with each other via in-vehicle communication lines 14.

A steering wheel 60 of the vehicle 10 is provided with a steering switch 62, to serve as an operation unit operated by a user. An operation state of the steering switch 62 is input to the OTA master 11 via the in-vehicle communication lines 14 or the like.

Software updates in the vehicle 10 are performed based on update data distributed from an OTA center 20 over the external network 18, or the like. The OTA center 20 is a server device that includes a processing circuit 21 and a storage device 22. The OTA center 20 is configured to be capable of communicating externally via the external network 18.

The OTA center 20 is configured to be able to also mutually communicate with a mobile information terminal 30 of the user of the vehicle 10, via the external network 18 or the like. The mobile information terminal 30 includes a processing circuit 31, a storage device 32, and an HMI 33. The processing circuit 31 reads and executes programs stored in the storage device 32. The programs stored in the storage device 32 include a program for vehicle management. The mobile information terminal 30 is capable of communicating with the wireless LAN communication module 17A by tethering.

Preparation Processing for Software Update

Next, processing for preparing for software update in the vehicle 10 will be described. Here, a case in which software of one of the ECUs 15 installed the vehicle 10 is updated will be described as an example. Note, however, that objects of software updates may be in-vehicle electronic equipment other than the ECUs 15, such as the HMI 16, sensors, and so forth.

Software updating is performed after preparation is complete. Preparation for software update is carried out through a download phase and an installation phase. In the download phase, update data for the software is downloaded from the OTA center 20 to the OTA master 11. In the download phase, the OTA master 11 receives the update data for the software from the OTA center 20. The OTA master 11 then stores the received update data in the storage device 13. The download phase includes a series of processing related to downloading, such as determining whether downloading is executable, verifying update data, and so forth. The update data transmitted from the OTA center 20 to the OTA master 11 may contain any of update software, compressed data in which the update software has been compressed, and divided data in which the update software or compressed data has been divided. Also, the update data may include an identifier of the in-vehicle electronic equipment to be updated, and an identifier of the software before the update. The update data is downloaded as a distribution package. The distribution package includes update data for one or a plurality of in-vehicle electronic equipment.

In the installation phase, updated software is written to the in-vehicle electronic equipment to be updated. In the installation phase, the OTA master 11 writes the update software to non-volatile memory of the ECU 15 to be updated. The installation phase includes a series of processing related to installation, such as determining whether installation is executable, transferring update data, verifying update software, and so forth. When the update data includes the update software itself, the OTA master 11 transfers the update data to the in-vehicle electronic equipment to be updated in the installation phase. When the update data includes compressed data, difference data, or divided data, of the update software, generating processing for generating update software from the update data is performed. The generating processing may be performed by the OTA master 11 or may be performed by the in-vehicle electronic equipment to be updated. Generating of the update software can be performed by decompressing compressed data, or assembling difference data or divided data.

After the installation phase is completed, a scheduled start time is set for the software update. Setting of the scheduled start time is performed, for example, by the following procedures. When update preparation is completed, the OTA master 11 causes the HMI 16 to display a setting screen for the scheduled start time. Upon the user of the vehicle 10 setting the scheduled start time at the HMI 16 on which the setting screen is displayed, the HMI 16 transmits the scheduled start time set by the user to the OTA master 11. The OTA master 11 stores the scheduled start time received from the HMI 16 in the storage device 13.

Such setting of the scheduled start time may be performed at the mobile information terminal 30. In this case, the scheduled start time set by the user at the mobile information terminal 30 is transmitted to the OTA master 11 of the vehicle 10 via the OTA center 20.

Update Processing for Software

Next, update processing for software will be described. The update processing is processing of switching the in-vehicle electronic equipment to be updated from a state of operating using the software before the update, to a state of operating using the software after the update.

When the scheduled start time set by the user arrives, the OTA master 11 determines whether execution conditions for activation are met. Execution conditions are individually set for each type of in-vehicle electronic equipment and update software. For example, in the case of in-vehicle electronic equipment such as the engine ECU, the transmission ECU, the brake ECU, or the like, that performs control necessary for the vehicle 10 to travel, the execution conditions for software update include that the vehicle 10 is not traveling.

When the execution conditions are not met, the OTA master 11 suspends execution of the update processing, and thereupon requests resetting of the scheduled start time. When the execution conditions are met, the OTA master 11 starts the update processing. During the update processing, the OTA master 11 instructs the in-vehicle electronic equipment to be updated to activate the updated software. The in-vehicle electronic equipment to be updated performs activation in accordance with this instruction. The update processing includes a series of processing related to activation, such as verification of execution results of activation, and so forth.

Inquiry Processing

The OTA master 11 executes inquiry processing while receiving update data via the wireless LAN. In the inquiry processing, the OTA master 11 determines whether the connection with the wireless LAN will be disconnected while receiving update data via the wireless LAN. When determining that the connection with the wireless LAN will be disconnected, the OTA master 11 inquires of the user of the vehicle regarding whether reception of update data via the cellular line is acceptable.

Figure 2:
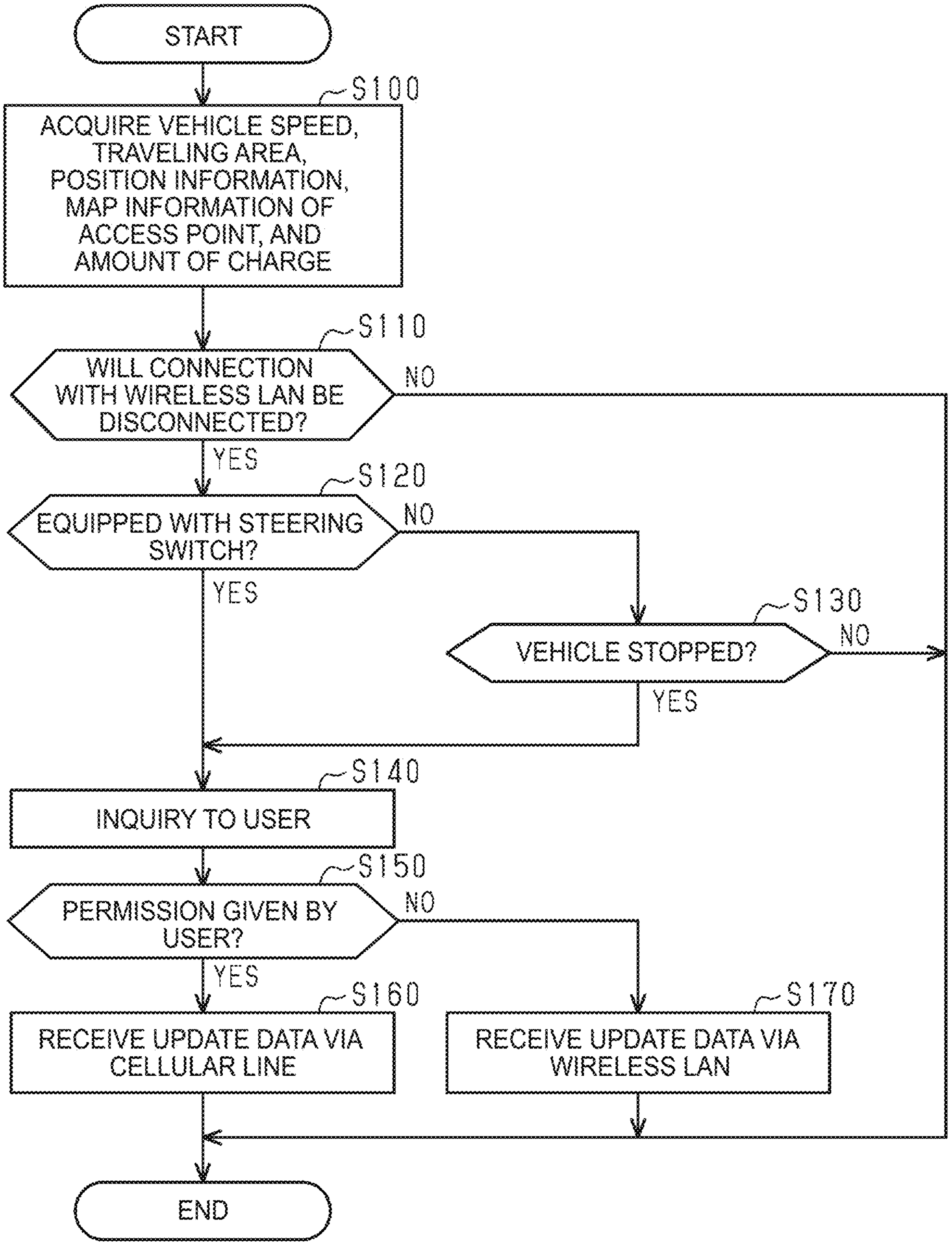
FIG. 2 is a flowchart of an inquiry routine executed by the software management system.

FIG. 2 shows a flowchart of an inquiry routine executed by the OTA master 11 for the inquiry processing. The OTA master 11 repeatedly executes the same routine at every predetermined control cycle while receiving update data via the wireless LAN. Note that hereinafter, a step number of each processing is represented by a number prefixed with the letter “S”.

When this routine starts, the OTA master 11 first, in S100, acquires vehicle speed of the vehicle 10, a traveling area in which the vehicle 10 is traveling, current position information of the vehicle 10, and map information of an access point for wireless LAN that is currently connected to. Also, when the update data is received via the wireless LAN by tethering the mobile information terminal 30, the amount of charge of the mobile information terminal 30 is also acquired. The OTA master 11 acquires the vehicle speed based on a detection value of a vehicle speed sensor of the vehicle 10, for example. The OTA master 11 acquires the traveling area, the position information, and the map information of the access point for wireless LAN, from the HMI 16, for example. The OTA master 11 acquires the amount of charge of the mobile information terminal 30 through communication with the mobile information terminal 30 during tethering.

Next, the OTA master 11 determines whether there is a likelihood that the connection with the wireless LAN will be disconnected, based on each parameter acquired in S100 (S110).

When the vehicle speed no lower than a predetermined threshold value, the OTA master 11 determines that there is a likelihood that the connection with the wireless LAN will be disconnected. Furthermore, depending on the traveling area of the vehicle, it is highly likely that the connection with the wireless LAN will be disconnected. Accordingly, when the position information of the vehicle 10 is within such a traveling area, the OTA master 11 determines that there is a likelihood of the connection with the wireless LAN being disconnected. Also, when the position information of the vehicle 10 becomes distanced from the access point for wireless LAN indicated in the map information, it is highly likely that the connection with the wireless LAN will be disconnected. Accordingly, when the position information of the vehicle 10 is distanced from the map information of the access point for wireless LAN by no less than a predetermined value, the OTA master 11 determines that there is a likelihood of the connection with the wireless LAN being disconnected. Also, when the amount of charge of the mobile information terminal 30 drops when reception of update data via wireless LAN is being performed by tethering of the mobile information terminal 30, it is highly likely that the tethering will be interrupted, and there is a likelihood of the connection with the wireless LAN being disconnected. Accordingly, when the amount of charge of the mobile information terminal 30 is no greater than the predetermined value, the OTA master 11 determines that there is a likelihood of the connection with the wireless LAN being disconnected.

When the OTA master 11 determines in S110 that there is a likelihood that the connection with the wireless LAN will be disconnected (YES in S110), the OTA master 11 determines whether the vehicle 10 is equipped with the steering switch 62 (S120). When the OTA master 11 determines that the steering switch 62 is installed (YES S120), the OTA master 11 advances the processing to S140.

On the other hand, when the OTA master 11 determines in the processing of S120 that the steering switch 62 is not installed (NO in S120), the OTA master 11 determines whether the vehicle 10 is stopped (S130). When the OTA master 11 determines that the vehicle 10 is stopped (YES in S130), the OTA master 11 advances the processing to S140.

In S140, the OTA master 11 inquires of the user of the vehicle regarding whether reception of update data via the cellular line is acceptable (S140). For this inquiry to the user, the HMI 16 executes a notification instructed by the OTA master 11, for example. Specifically, the HMI 16 displays a message on the screen, querying whether it is acceptable to switch the reception of update data from via the wireless LAN to via the cellular line.

Next, the OTA master 11 determines whether the user has given permission to switch the reception of update data to via the cellular line (S150). In S150, when the user has given permission to switch to via the cellular line through operation of the HMI 16, the OTA master 11 determines that the user has given permission to switch to via the cellular line. Also, in S150, when the user has given permission to switch to via the cellular line through operation of the steering switch 62, the OTA master 11 determines that the user has given permission to switch to via the cellular line.

When the OTA master 11 determines that the user has given permission (YES in S150), the OTA master 11 receives the update data via the cellular line communication module 17B, thereby receiving the update data via the cellular line (S160). Conversely, when the OTA master 11 determines that the user has not given permission (NO in S150), the OTA master 11 receives the update data via the wireless LAN communication module 17A, thereby receiving the update data via the wireless LAN (S170).

Then, when ending the processing in S160 and S170, or when making a negative determination in S110, or when making a negative determination in S130, the OTA master 11 ends the execution of the present processing in the current control cycle.

Operations and Effects

Operations and effects of the present embodiment will be described.

(1) While receiving update data for software via the wireless LAN, determination is made regarding whether the connection with the wireless LAN will be disconnected. When determining that the connection with the wireless LAN will be disconnected, inquiry is made of the user of the vehicle regarding whether reception of update data via the cellular line is acceptable. Accordingly, user convenience is improved.

(2) Determination is made regarding whether the connection with the wireless LAN will be disconnected based on the vehicle speed, which pertains to the connection state of the wireless LAN. Accordingly, whether the connection with the wireless LAN will be disconnected can be appropriately determined.

(3) Determination is made regarding whether the connection with the wireless LAN will be disconnected based on the traveling area of the vehicle 10, which pertains to the connection state of the wireless LAN. Accordingly, whether the connection with the wireless LAN will be disconnected can be appropriately determined.

(4) Determination is made regarding whether the connection with the wireless LAN will be disconnected based on the map information of the access point for wireless LAN and the position information of the vehicle 10, which pertain to the connection state of the wireless LAN. Accordingly, whether the connection with the wireless LAN will be disconnected can be appropriately determined.

(5) When the connection with the wireless LAN is performed by tethering the mobile information terminal 30, the amount of charge of the mobile information terminal 30 pertains to the connection state of the wireless LAN. Accordingly, determination is made regarding whether the connection with the wireless LAN will be disconnected based on the amount of charge of the mobile information terminal 30 that pertains to the connection state of the wireless LAN. Accordingly, whether the connection with the wireless LAN will be disconnected can be appropriately determined.

(6) When the vehicle 10 is stopped (YES in S130 in FIG. 2), the OTA master 11 inquires of the user of the vehicle regarding whether receiving update data via the cellular line is acceptable (S140 in FIG. 2). Accordingly, safety regarding vehicle operation is improved as compared to when such inquiries to the user are made while the vehicle 10 is traveling.

(7) The steering wheel 60 of the vehicle 10 has the steering switch 62 that enables selection of whether receiving update data via the cellular line is acceptable. When determination is made that the vehicle 10 is equipped with the steering switch 62 (YES in S120 in FIG. 2), the OTA master 11 then makes the above-mentioned inquiry to the user without performing the processing in S130. (S140 in FIG. 2). Accordingly, when the vehicle 10 is equipped with the steering switch 62, the above-described inquiry to the user is made even while the vehicle 10 is traveling. Now, the steering switch 62 can be operated while operating the steering wheel of the vehicle 10, and accordingly the above inquiry to the user can be made even while the vehicle is traveling, while ensuring safety regarding vehicle operation. Thus, user convenience or the like is improved, for example.

Correlation

In S110 in FIG. 2, the OTA master 11 performs processing of determining whether the connection with the wireless LAN will be disconnected while receiving update data via the wireless LAN. Also, in S140 in FIG. 2, when determination is made that the connection with the wireless LAN will be disconnected, the OTA master 11 performs processing of inquiring of the user of the vehicle regarding whether reception of update data via the cellular line is acceptable. In the present embodiment, such an OTA master 11 corresponds to a determination unit, an inquiry unit, and a software management system. Also, the program of the OTA master 11 that executes the processing as the determination unit and the inquiry unit corresponds to a software management program.

Modifications

Note that the above embodiment can be implemented with the following modifications. The above embodiment and the following modifications can be carried out in combination with each other insofar as no technical contradiction arises.

In the processing of S110 shown in FIG. 2, the following parameters are used to determine whether there is a likelihood that the connection with the wireless LAN will be disconnected. That is to say, the parameters are the vehicle speed of the vehicle 10, the traveling area in which the vehicle 10 is traveling, the current position information of the vehicle 10, the map information of the access point for wireless LAN that is currently connected to, and the amount of charge of the mobile information terminal 30. Determination may be made regarding whether there is a likelihood that the connection with the wireless LAN will be disconnected, based on at least one of these parameters. Note that the expression "at least one" as used in the present specification means "one or more" of desired options. As an example, the expression "at least one" as used in the present specification means "only one option" or "both of the two options" when the number of options is two. As another example, the expression "at least one" as used in the present specification means "only one option" or "a combination of any two or more options" when the number of options is three or more.

Parameters that are different from the above parameters may be used as parameters for determining whether there is a likelihood that the connection with the wireless LAN will be disconnected.

An arrangement may be made in which the processing of S120 shown in FIG. 2 is omitted, and when an affirmative determination is made in the processing of S110, the processing of S130 is executed. In this case as well, operations and effects other than the above (7) can be obtained.

An arrangement may be made in which the processing of S120 and S130 shown in FIG. 2 are omitted, and when an affirmative determination is made in the processing of S110, the processing of S140 is executed. In this case as well, operations and effects other than the above (6) and (7) can be obtained.

A communication standard different from Wi-Fi communication may be used as the wireless LAN.

APPENDICES

Technical ideas that can be comprehended from the above embodiment and modifications will be described.

A software management system for a vehicle includes: a first communication device configured to receive update data for software via a wireless local area network (LAN); a second communication device configured to receive the update data via a cellular line; a determination unit configured to determine whether a connection between the wireless LAN and the first communication device will be disconnected during reception of the update data via the wireless LAN; and an inquiry unit configured to, when the determination unit determines that the connection between the wireless LAN and the first communication device will be disconnected, make an inquiry to a user of the vehicle regarding whether reception of the update data via the cellular line is acceptable.

In the above aspect, the determination unit may be configured to determine whether the connection between the wireless LAN and the first communication device will be disconnected, based on speed of the vehicle.

In the above aspect, the determination unit may be configured to determine whether the connection between the wireless LAN and the first communication device will be disconnected, based on a traveling area in which the vehicle is traveling.

In the above aspect, the determination unit may be configured to determine whether the connection between the wireless LAN and the first communication device will be disconnected, based on map information of an access point for the wireless LAN and position information of the vehicle.

In the above aspect, the determination unit may be configured to determine whether the connection between the wireless LAN and the first communication device will be disconnected, based on an amount of charge of a mobile information terminal, when the connection with the wireless LAN is performed by tethering of the mobile information terminal.

In the above aspect, the inquiry unit may be configured to make the inquiry to the user while the vehicle is stopped.

In the above aspect, a steering wheel of the vehicle may include an operation unit configured to be operated to select whether the reception is acceptable. The inquiry unit may be further configured to make the inquiry to the user while the vehicle is traveling.

What is claimed is:

1. A software management system for a vehicle, the software management system comprising:
- a first communication device configured to receive update data for software via a wireless local area network (LAN);
- a second communication device configured to receive the update data via a cellular line; and
- one or more electronic control units configured to:
  - determine whether a connection between the wireless LAN and the first communication device will be disconnected during reception of the update data via the wireless LAN based on an amount of charge of a mobile information terminal when the connection with the wireless LAN is performed by tethering of the mobile information terminal,
  - in response to determining that the connection between the wireless LAN and the first communication device will be disconnected, make an inquiry to a user of the vehicle regarding whether reception of the update data via the cellular line is acceptable, and
  - in response to receiving a permission to receive the update data via the cellular line, receive the update data via the second communication device.

2. The software management system according to claim 1, wherein the one or more electronic control units are configured to determine whether the connection between the wireless LAN and the first communication device will be disconnected, based on speed of the vehicle.

3. The software management system according to claim 1, wherein the one or more electronic control units are configured to determine whether the connection between the wireless LAN and the first communication device will be disconnected, based on a traveling area in which the vehicle is traveling.

4. The software management system according to claim 1, wherein the one or more electronic control units are configured to determine whether the connection between the wireless LAN and the first communication device will be disconnected, based on map information of an access point for the wireless LAN and position information of the vehicle.

5. The software management system according to claim 1, wherein the one or more electronic control units are configured to make the inquiry to the user while the vehicle is stopped.

6. The software management system according to claim 5, wherein:
- a steering wheel of the vehicle includes a switch configured to be operated to select whether the reception is acceptable; and
- the one or more electronic control units are further configured to make the inquiry to the user while the vehicle is traveling.

7. A software management method for a vehicle including a first communication device configured to receive update data for software via a wireless local area network (LAN) and a second communication device configured to receive the update data via a cellular line, the software management method comprising:
- determining, by one or more electronic control units, whether a connection between the wireless LAN and the first communication device will be disconnected during reception of the update data via the wireless LAN, based on an amount of charge of a mobile information terminal when the connection with the wireless LAN is performed by tethering of the mobile information terminal;
- making, by the one or more electronic control units, an inquiry to a user of the vehicle regarding whether reception of the update data via the cellular line is acceptable, when determination is made that the connection between the wireless LAN and the first communication device will be disconnected; and
- in response to receiving a permission to receive the update data via the cellular line, receive the update data via the second communication device.

8. A non-transitory storage medium storing instructions for managing software of a vehicle including a first communication device configured to receive update data for the software via a wireless local area network (LAN) and a second communication device configured to receive the update data via a cellular line, the instructions being executable by one or more electronic control units and causing the electronic control units to perform functions, the functions comprising:
- determining whether a connection between the wireless LAN and the first communication device will be disconnected during reception of the update data via the wireless LAN, based on an amount of charge of a mobile information terminal when the connection with the wireless LAN is performed by tethering of the mobile information terminal;
- making an inquiry to a user of the vehicle regarding whether reception of the update data via the cellular line is acceptable, when determination is made that the connection between the wireless LAN and the first communication device will be disconnected; and
- in response to receiving a permission to receive the update data via the cellular line, receive the update data via the second communication device.

* * * * *